(No Model.)
T. M. BISSELL.
WHEEL FOR SULKY PLOWS.
No. 258,698. Patented May 30, 1882.
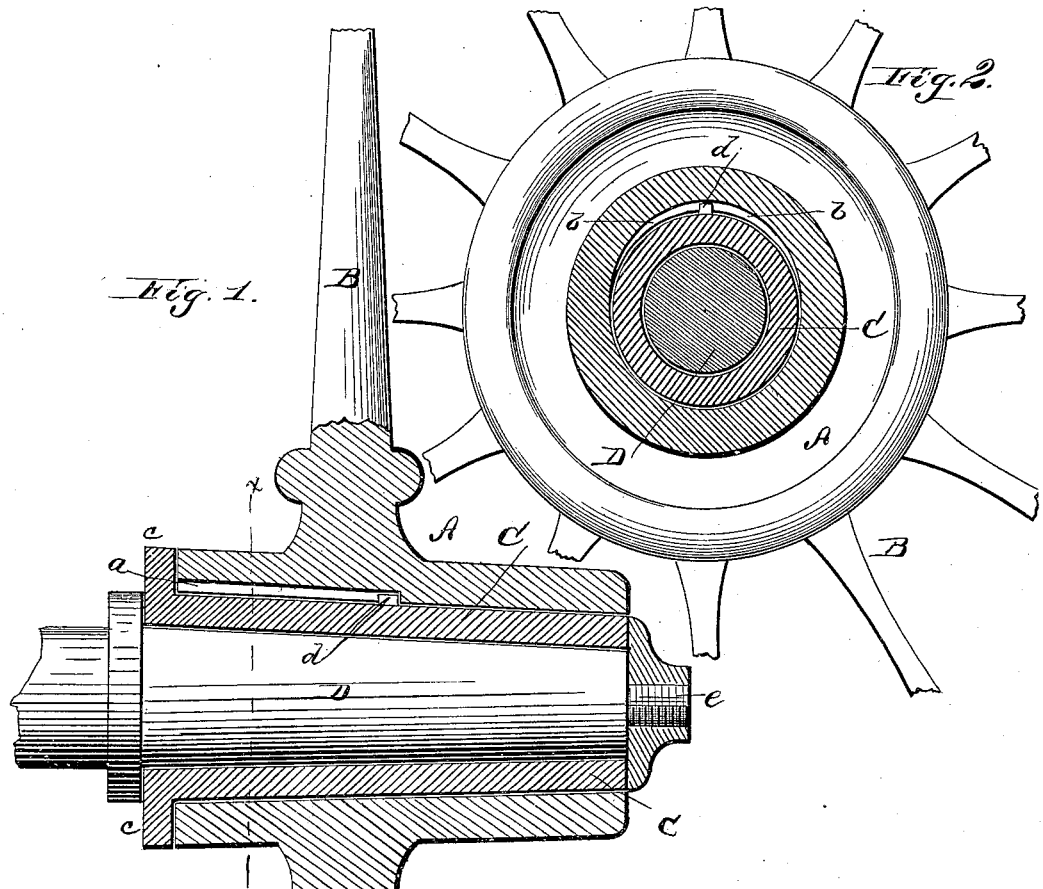
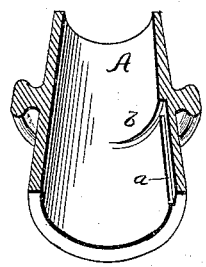
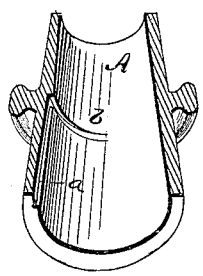
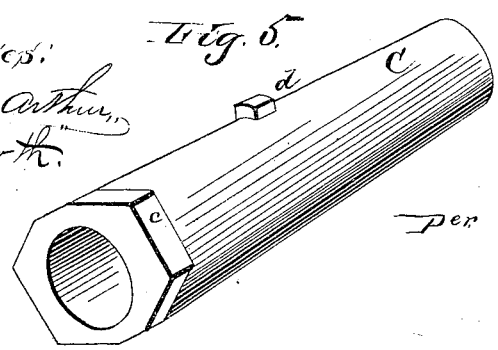

UNITED STATES PATENT OFFICE.

THELUS M. BISSELL, OF SOUTH BEND, INDIANA.

WHEEL FOR SULKY-PLOWS.

SPECIFICATION forming part of Letters Patent No. 258,698, dated May 30, 1882.

Application filed April 1, 1882. (No model.)

*To all whom it may concern:*

Be it known that I, THELUS M. BISSELL, of South Bend, in the county of St. Joseph and State of Indiana, have invented certain new and useful Improvements in Sulky-Plows; and I do hereby declare that the following is a full, clear, and exact description thereof, reference being had to the accompanying drawings, and to the letters of reference marked thereon, which form part of this specification, in which—

Figure 1 is a diametrical section through my improved wheel applied on the axle of an arched axle-tree. Fig. 2 is an enlarged cross-section taken in the plane indicated by dotted lines $x$ $x$, Fig. 1. Figs. 3 and 4 are perspective views of the hub divided longitudinally, exposing to view the channels therein. Fig. 5 is a perspective view of the removable hub box or thimble.

This invention relates to wheel-hubs which are especially designed for the wheels of sulky-plows, but which are also applicable to other wheels; and the nature of my invention consists in so constructing the hub of a wheel and the removable thimble or bushing thereof that the two parts can be readily and rigidly secured together and the thimble easily removed from the hub and replaced by a new thimble when desired.

In the annexed drawings, A designates the hub of a wheel, which hub is preferably cast about the tenons of the spokes B, so that these spokes and the hub are practically one solid piece. The rim of the wheel may be secured to the spokes in any suitable manner.

The hub A has a tapered bore, into which is fitted and secured, as will be presently explained, a thimble, box, or bushing, C, adapted to receive the axle D.

In the process of casting the hub A, I form in it a longitudinal groove or channel, $a$, which extends to about the middle of its length in its inner surface and terminates at its inner end in two lateral branching grooves, $b$ $b$, which are at right angles to the straight groove $a$. The two grooves $b$ $b$ are in the same plane, and they gradually diminish in depth from groove $a$ until they reach about one-quarter of the distance around the bore of the hub on opposite sides of said groove, as shown in Fig. 2. The bases of the grooves $b$ $b$ are thus eccentric to the axis of the hub.

The thimble C is constructed with a flange or collar, $c$, on its largest end, which I prefer to make prismatic, as shown in Fig. 5, so that it can be securely held between the jaws of a wrench. This thimble is also constructed with a boss or lug, $d$, on its circumference, having a convex outer end and adapted to enter the grooves $a$ $b$ $b$. To secure the thimble in its hub the lug or boss $d$ is adjusted so as to register with the straight or longitudinal groove $a$ in the hub. The thimble is then pressed into the hub until the lug $d$ is in line with the two grooves $b$ $b$. Then, by means of a wrench applied to the collar $c$ of the thimble, the latter is forcibly turned about its axis, thereby moving the lug $d$ into one of the grooves $b$ and binding the thimble firmly in its place in the hub. In turning the lug $d$ into a groove, $b$, the thimble should always be turned in a direction opposite to the direction of rotation which the wheel will take when the machine is moved forward. One of the grooves, $b$, serves to receive the lug $d$ for a right-hand wheel and the other groove serves to receive the lug $d$ for a left-hand wheel.

When the thimble C is adjusted in the hub, as above described, the axle D is passed through it, and a nut, or nut and washer, applied on the small screw-threaded portion $e$ of the axle.

One of the advantages of my invention is that a hub is made to last for an indefinite length of time, for the reason that when one thimble, C, wears out it can be replaced by a new one; and another advantage is that the hubs and their thimbles are reversible for right or left hand wheels.

Having described my invention, I claim—

1. The wheel-hub A, constructed with internal grooves, $a$ $b$ $b$, in combination with the thimble having a lug, $d$, formed on it for the purpose of binding the hub and thimble, substantially as described.

2. The combination of the internally-grooved hub, the thimble having a collar and a lug formed on it externally, and the nut-fastening for the axle, substantially as described.

In testimony that I claim the foregoing as my own I affix my signature in presence of two witnesses.

THELUS M. BISSELL.

Witnesses:
JAS. DU SHANE,
WILLIS A. BUGBEE.